(12) United States Patent
Chen et al.

(10) Patent No.: US 10,806,209 B2
(45) Date of Patent: Oct. 20, 2020

(54) COMPOSITE SOLES

(71) Applicant: Under Armour, Inc., Baltimore, MD (US)

(72) Inventors: Vincent Chen, Guangzhou (CN); Tom Luedecke, Portland, OR (US)

(73) Assignee: Under Armour, Inc., Baltimore, MD (US)

( * ) Notice: Subject to any disclaimer, the term of this patent is extended or adjusted under 35 U.S.C. 154(b) by 163 days.

(21) Appl. No.: 15/861,581

(22) Filed: Jan. 3, 2018

(65) Prior Publication Data

US 2018/0192731 A1 Jul. 12, 2018

Related U.S. Application Data

(60) Provisional application No. 62/443,408, filed on Jan. 6, 2017.

(51) Int. Cl.

| | | |
|---|---|---|
| *A43B 1/04* | (2006.01) | |
| *A43B 13/04* | (2006.01) | |
| *D04B 21/20* | (2006.01) | |
| *D01F 1/10* | (2006.01) | |
| *D01D 10/02* | (2006.01) | |
| *B29D 35/12* | (2010.01) | |
| *D06N 3/00* | (2006.01) | |
| *A43B 13/14* | (2006.01) | |

(Continued)

(52) U.S. Cl.
CPC ............... *A43B 1/04* (2013.01); *A43B 13/04* (2013.01); *A43B 13/14* (2013.01); *B29D 35/122* (2013.01); *D01D 5/247* (2013.01); *D01D 10/02* (2013.01); *D01F 1/08* (2013.01); *D01F 1/10* (2013.01); *D04B 21/207* (2013.01); *D06N 3/005* (2013.01); *B29C 44/358* (2013.01); *B29K 2075/00* (2013.01); *B29K 2105/04* (2013.01); *D06N 3/0002* (2013.01); *D06N 3/0009* (2013.01); *D06N 3/14* (2013.01); *D06N 2211/106* (2013.01); *D10B 2501/043* (2013.01)

(58) Field of Classification Search
CPC ........ A43B 1/04; B29D 35/122; D01D 10/02; D06N 3/005
See application file for complete search history.

(56) References Cited

U.S. PATENT DOCUMENTS 3,389,446 A * 6/1968 Parrish ................... D03D 15/00
28/165
3,627,858 A 12/1971 Parts et al.
(Continued)

FOREIGN PATENT DOCUMENTS

CN 203256527 U 10/2013
WO 2018/129139 A1 7/2018

OTHER PUBLICATIONS

International Preliminary Report on Patentability dated Jul. 18, 2019 for International Patent Application No. PCT/US2018/012315.

(Continued)

*Primary Examiner* — Stella K Yi
(74) *Attorney, Agent, or Firm* — Plumsea Law Group, LLC

(57) ABSTRACT

In one embodiment a non-foamed thread is formed by extruding a mixture with a plastic material and a blowing agent. The non-foamed thread is arranged into a sole component and then heated to activate the blowing agent and cause the threads to foam. In some cases, the non-foamed thread is knitted together.

20 Claims, 15 Drawing Sheets

(51) Int. Cl.
*D01D 5/247* (2006.01)
*D01F 1/08* (2006.01)
*B29K 105/04* (2006.01)
*D06N 3/14* (2006.01)
*B29C 44/34* (2006.01)
*B29K 75/00* (2006.01)

(56) References Cited

U.S. PATENT DOCUMENTS

| | | | |
|---|---|---|---|
| 4,094,950 | A | 6/1978 | Oldham |
| 4,243,713 | A | 1/1981 | Worrall et al. |
| 4,524,529 | A | 6/1985 | Schaefer |
| 5,401,564 | A | 3/1995 | Lee et al. |
| 5,617,585 | A | 4/1997 | Fons et al. |
| 5,840,632 | A | 11/1998 | Miller |
| 6,537,472 | B2 | 3/2003 | Masubuchi |
| 6,877,255 | B2 | 4/2005 | O'Hare |
| 6,986,183 | B2 | 1/2006 | Delgorgue et al. |
| 7,476,630 | B2 | 1/2009 | Schwartz et al. |
| 7,926,519 | B1 | 4/2011 | Wigent, III |
| 8,209,883 | B2 | 7/2012 | Lyden |
| 8,584,378 | B2 | 11/2013 | Weidl et al. |
| 8,715,549 | B2 | 5/2014 | Lee |
| 2003/0060110 | A1 | 3/2003 | Desai |
| 2004/0000740 | A1 | 1/2004 | Chi |
| 2006/0010716 | A1* | 1/2006 | Kerns .................. A43B 13/04 36/25 R |
| 2013/0047471 | A1* | 2/2013 | Liang .................. A43B 7/1405 36/136 |
| 2013/0091738 | A1 | 4/2013 | Peikert et al. |
| 2013/0269209 | A1 | 10/2013 | Lang et al. |
| 2014/0242292 | A1 | 8/2014 | Hwuang et al. |
| 2014/0259779 | A1 | 9/2014 | Hashish et al. |
| 2014/0310986 | A1* | 10/2014 | Tamm ...................... A43B 1/00 36/84 |
| 2015/0345075 | A1 | 12/2015 | De Vries |
| 2016/0095384 | A1 | 4/2016 | Kraft |
| 2016/0185930 | A1* | 6/2016 | Lesser, Jr. ............... C08J 9/142 521/180 |
| 2017/0073490 | A1 | 3/2017 | Huang et al. |
| 2017/0121854 | A1* | 5/2017 | van der Gaag ...... D03D 1/0035 |
| 2017/0135439 | A1 | 5/2017 | Davis et al. |
| 2017/0144407 | A1 | 5/2017 | Hansen |

OTHER PUBLICATIONS

International Search Report and Written Opinion dated Mar. 26, 2018 for International Application No. PCT/US2018/12315.

* cited by examiner

COMPOSITE SOLES

REFERENCE TO RELATED APPLICATIONS

The present application claims priority to U.S. Provisional Application No. 62/443,408, filed Jan. 6, 2017, and titled "Composite Soles," the entirety of which is herein incorporated by reference.

BACKGROUND

The embodiments are generally directed to sole structures and the methods and processes used to form various portions of sole structures.

Conventional articles of footwear generally include two primary elements, an upper and a sole structure. The upper and the sole structure, at least in part, define a foot-receiving chamber that may be accessed by a user's foot through a foot-receiving opening. The sole structure is secured to a lower area of the upper, thereby being positioned between the upper and the ground.

Sole structures may be formed with various components that require multiple steps to form a completed sole structure. As the number and type of material elements incorporated into the midsole and outsole increases, the time and expense associated with transporting, stocking, cutting, and joining the material elements may also increase. Waste material from cutting and stitching processes also accumulates to a greater degree as the number and type of material elements incorporated into the upper increases. By decreasing the number steps necessary to form the midsole and outsole the manufacturing efficiency may be increased.

SUMMARY

Knitted components can be coated with various materials to change the properties of a knitted component. The knitted components may be coated in polyurethane to increase stiffness or rigidity.

Sole structures can also be formed of foamed thread to allow for precise and accurate usage of material. The foamed thread can be formed of various materials and with or without blowing agents or cross-linking agents.

In one aspect, a method of forming a knitted component for an article, comprises extruding a mixture including a plastic material to form a non-foamed plastic thread, knitting the non-foamed plastic component into a knitted component, and causing the non-foamed plastic thread to undergo a foaming process to form a knitted component with foamed plastic threads.

In another aspect, a method of forming a sole component, comprises extruding a mixture including a plastic material to form a non-foamed plastic thread, arranging the non-foamed plastic thread into a sole component, and causing the non-foamed plastic thread to undergo a foaming process to form a sole component with foamed plastic threads.

In another aspect, an article of footwear, comprises an upper and a sole component, where the sole component comprising a plurality of foamed plastic threads knitted together.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
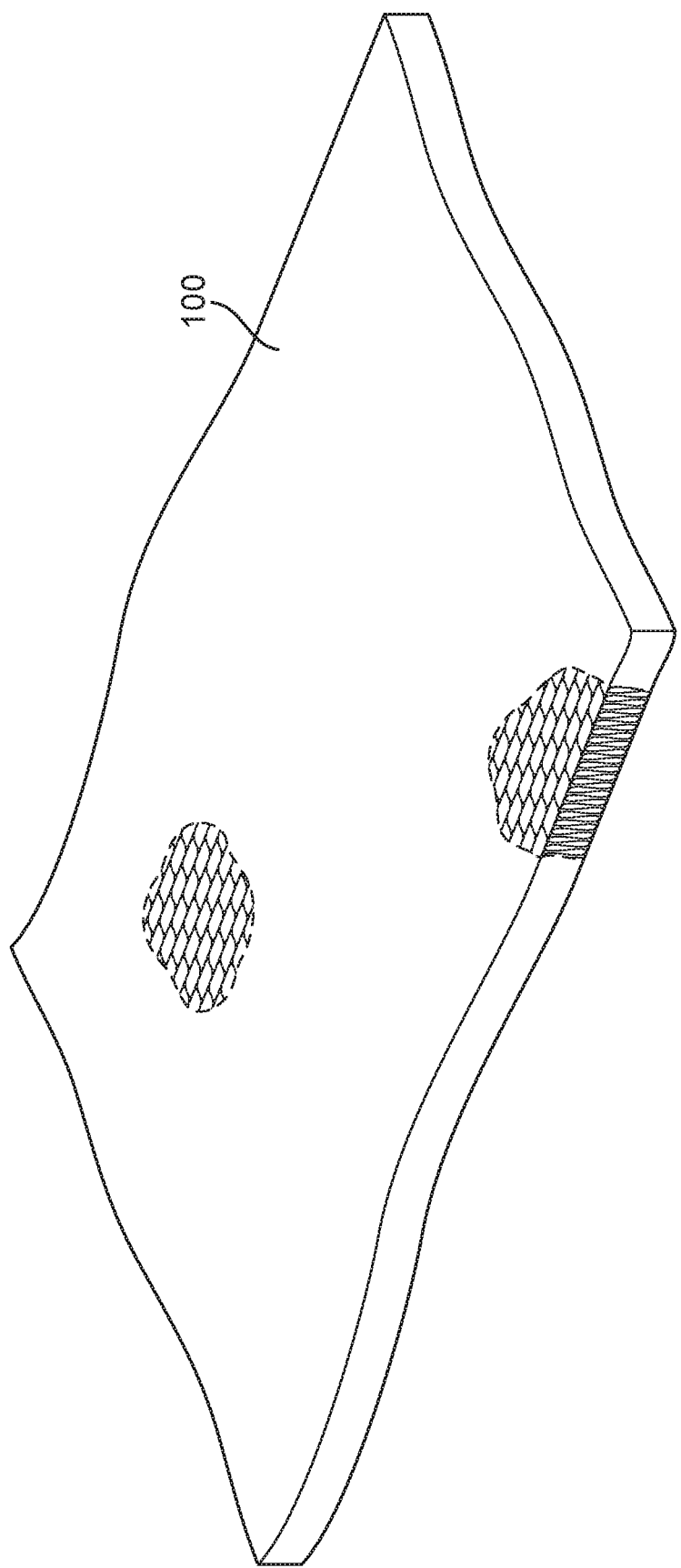
FIG. 1 is a schematic view of an embodiment of a knitted component.

In the following detailed description, reference is made to the accompanying figures which form a part hereof, wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structure, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure are synonymous.

As used herein, the term "article" refers broadly to articles of footwear, articles of apparel (e.g., clothing), as well as accessories and/or equipment. Articles of footwear include, but are not limited to: hiking boots, soccer shoes, football shoes, sneakers, running shoes, cross-training shoes, rugby shoes, basketball shoes, baseball shoes as well as other kinds of shoes. Moreover, in some embodiments, components may be configured for various kinds of non-sports related footwear, including, but not limited to: slippers, sandals, high heeled footwear, loafers as well as any other kinds of footwear, Articles of apparel include, but are not limited to: socks, pants, shorts, shirts, sweaters, undergarments, hats, gloves, as well as other kinds of garments. Accessories include scarves, bags, purses, backpacks, as well as other accessories. Equipment may include various kinds of sporting equipment including, but not limited to: bats, balls, various sporting gloves (e.g., baseball mitts, football gloves, ski gloves, etc.), golf clubs, as well as other kinds of sporting equipment.

To assist and clarify the subsequent description of various embodiments, various terms are defined herein. Unless otherwise indicated, the following definitions apply throughout this specification (including the claims). For consistency and convenience, directional adjectives are employed throughout this detailed description corresponding to the illustrated embodiments.

For purposes of general reference, an article of footwear may be divided into three regions: a forefoot region, a midfoot region, and a heel region. The forefoot region may be generally associated with the toes and joints connecting the metatarsals with the phalanges. The midfoot region may be generally associated with the arch of a foot, including the instep. Likewise, the heel region or "hindfoot" may be generally associated with the heel of a foot, including the calcaneus bone. For purposes of this disclosure, the following directional terms, when used in reference to an article of footwear, shall refer to the article of footwear when sitting in an upright position, with the sole facing the ground, that is, as it would be positioned when worn by a wearer standing on a substantially level surface.

The term "longitudinal," as used throughout this detailed description and in the claims, refers to a direction extending along the length of a component. For example, a longitudinal direction of an article of footwear extends from the forefoot region to the heel region of the article of footwear. The term "forward" or "front" is used to refer to the general direction in which the toes of a foot point, and the term "rearward" or "back" is used to refer to the opposite direction, i.e., the direction in which the heel of the foot is facing.

The term "lateral direction," as used throughout this detailed description and in the claims, refers to a side-to-side direction extending along the width of a component. In other words, the lateral direction may extend between a medial side and a lateral side of an article of footwear, with the lateral side of the article of footwear being the surface that faces away from the other foot, and the medial side being the surface that faces toward the other foot.

The term "vertical," as used throughout this detailed description and in the claims, refers to a direction generally perpendicular to both the lateral and longitudinal directions. For example, in cases where an article of footwear is planted flat on a ground surface, the vertical direction may extend from the ground surface upward. It will be understood that each of these directional adjectives may be applied to individual components of an article of footwear. The term "upward" refers to the vertical direction heading away from a ground surface, while the term "downward" refers to the vertical direction heading towards the ground surface. Similarly, the terms "top," "upper," and other similar terms refer to the portion of an object substantially furthest from the ground in a vertical direction, and the terms "bottom," "lower," and other similar terms refer to the portion of an object substantially closest to the ground in a vertical direction.

The term "side," as used in this specification and in the claims, refers to any portion of a component facing generally in a lateral, medial, forward, or rearward direction, as opposed to an upward or downward direction. The term "lateral side" refers to any component facing in general toward the lateral direction. The term "medial side" refers to any component facing in general towards the medial direction.

In the illustrated embodiments of FIGS. 1-8 an embodiment of a process of forming a sole structure or a portion of a sole structure is depicted. The process may be used to incorporate knit textiles or other textiles into the sole structure of an article of footwear. Further, the process may be used to reduce the quantity of time necessary to form a sole structure while also reducing the quantity of elements required to form a sole structure.

It will be understood that the forefoot region, the midfoot region, and the heel region are only intended for purposes of description and are not intended to demarcate precise regions of an article of footwear. For example, in some cases, one or more of the regions may overlap. Likewise, the medial side and the lateral side are intended to represent generally two sides, rather than precisely demarcating an article of footwear into two halves. In addition, the forefoot region, the midfoot region, and the heel region, as well as the medial side and the lateral side, may also be applied to individual components of an article of footwear, including a sole structure, an upper, a lacing system, and/or any other component associated with the article.

The "interior" of an article of footwear refers to space in this internal cavity that is occupied by a wearer's foot when the article of footwear is worn. The "inner side" or "inside" of an element refers to the face of that element that is (or will be) oriented toward the internal cavity in a completed article of footwear. The "outer side", "outside", or "exterior" of an element refers to the face of that element that is (or will be) oriented away from the internal cavity in the completed article of footwear. In some cases, the inner side of an element may have other elements between that inner side and the interior in the completed article of footwear. Similarly, an outer side of an element may have other elements between that outer side and the space external to the completed article of footwear. Further, the terms "inward" and "inwardly" shall refer to the direction toward the interior of the article of footwear, and the terms "outward" and "outwardly" shall refer to the direction toward the exterior of article of footwear.

Dissimilar materials described herein may be attached by fusing or welding. As utilized herein, the terms "fusing" and "welding" (and variants thereof) are defined as a securing technique between two elements that involves a softening or melting of the material of at least one of the elements such that the materials of the elements are secured to each other when cooled. Similarly, the term "weld" or variants thereof is defined as the bond, link, or structure that joins two elements through a process that involves a softening or melting of material within at least one of the elements such that the elements are secured to each other when cooled. Welding may involve the melting or softening of two components such that the materials from each component intermingle with each other, that is, the materials may diffuse across a boundary layer (or "heat affected zone") between the materials, and are secured together when cooled. Alternatively, welding may involve the melting or softening of a material in a first component such that the material extends into or infiltrates the structure of a second component, for example, infiltrating crevices or cavities in the second component or extending around or bonding with filaments or fibers in the second component to secure the components together when cooled. Thus, welding of two components together may occur when material from one or both of the components melts or softens. Accordingly, a weldable material, such as a polymer material, may be provided in one or both of the components. Additionally, welding does not generally involve the use of stitching or adhesives, but involves directly bonding components to each other with heat. In some situations, however, stitching or adhesives may be utilized to supplement the weld or the joining of the components through welding. Components that have been welded together will be understood to be "fused" together.

In addition, for purposes of this disclosure, the term "fixedly attached" shall refer to two components joined in a manner such that the components may not be readily separated (for example, without destroying one or both of the components). Exemplary modalities of fixed attachment may include joining with permanent adhesive, rivets, stitches, nails, staples, welding or other thermal bonding, or other joining techniques. In addition, two components may be "fixedly attached" by virtue of being integrally formed, for example, in a molding process.

For purposes of this disclosure, the term "removably attached" shall refer to the joining of two components in a manner such that the two components are secured together, but may be readily detached from one another. Examples of removable attachment mechanisms may include hook and loop fasteners, friction fit connections, interference fit connections, threaded connectors, cam-locking connectors, and other such readily detachable connectors. Similarly, "removably disposed" shall refer to the assembly of two components in a non-permanent fashion.

Referring to FIG. 1, a portion of a knitted component is depicted. In some embodiments knitted component 100 may be formed by warp knitting, flat knitting or other technique. Although depicted as a knitted component, the various techniques and process discussed herein may also be applicable to spacer mesh or other form of textile material such as a woven or non-woven material.

In some embodiments, the thickness of the knitted component may vary along the length of the knitted component. In other embodiments, the thickness of the knitted component may remain substantially consistent or constant along the length of the knitted component. Varying the thickness of the knitted component may influence or affect the properties of the knitted component. For example, a knitted component that is thicker may have greater shock absorption properties than a thinner knitted component. As shown in FIG. 1, knitted component 100 has a substantially constant thickness. Other embodiments may include variations in thickness of the knitted component.

In some embodiments, knitted component 100 may be formed of various materials. In some embodiments, knitted component 100 may be formed of multifilament or monofilament strands. In some embodiments, the strands may be formed of natural or synthetic materials or fibers. The properties of knitted component 100 may be varied by using different material types through knitted component 100. Examples of properties that may be varied through choice of yarn include color, pattern, luster, stretch, recovery, loft, hand, moisture absorption, biodegradability, abrasion-resistance, durability, and thermal conductivity. It should also be noted that two or more yarns may be utilized in combination to take advantage of properties from both yarns, such as when yarns are plated or form different courses in the same area.

The properties that a particular type of yarn will impart to a portion of knitted component 100 depend upon the materials that form the various filaments and fibers within the yarn. Cotton, for example, provides a soft hand, natural aesthetics, and biodegradability. Elastane and stretch polyester each provide substantial stretch and recovery, with stretch polyester also providing recyclability. Rayon provides high luster and moisture absorption. Wool also provides high moisture absorption, in addition to insulating properties and biodegradability. Nylon is durable, abrasion-resistant, and has relatively high strength. Polyester is a hydrophobic material that also provides relatively high durability. Different types of yarn may be incorporated into knitted component 100 depending on the properties desired.

Figure 2:
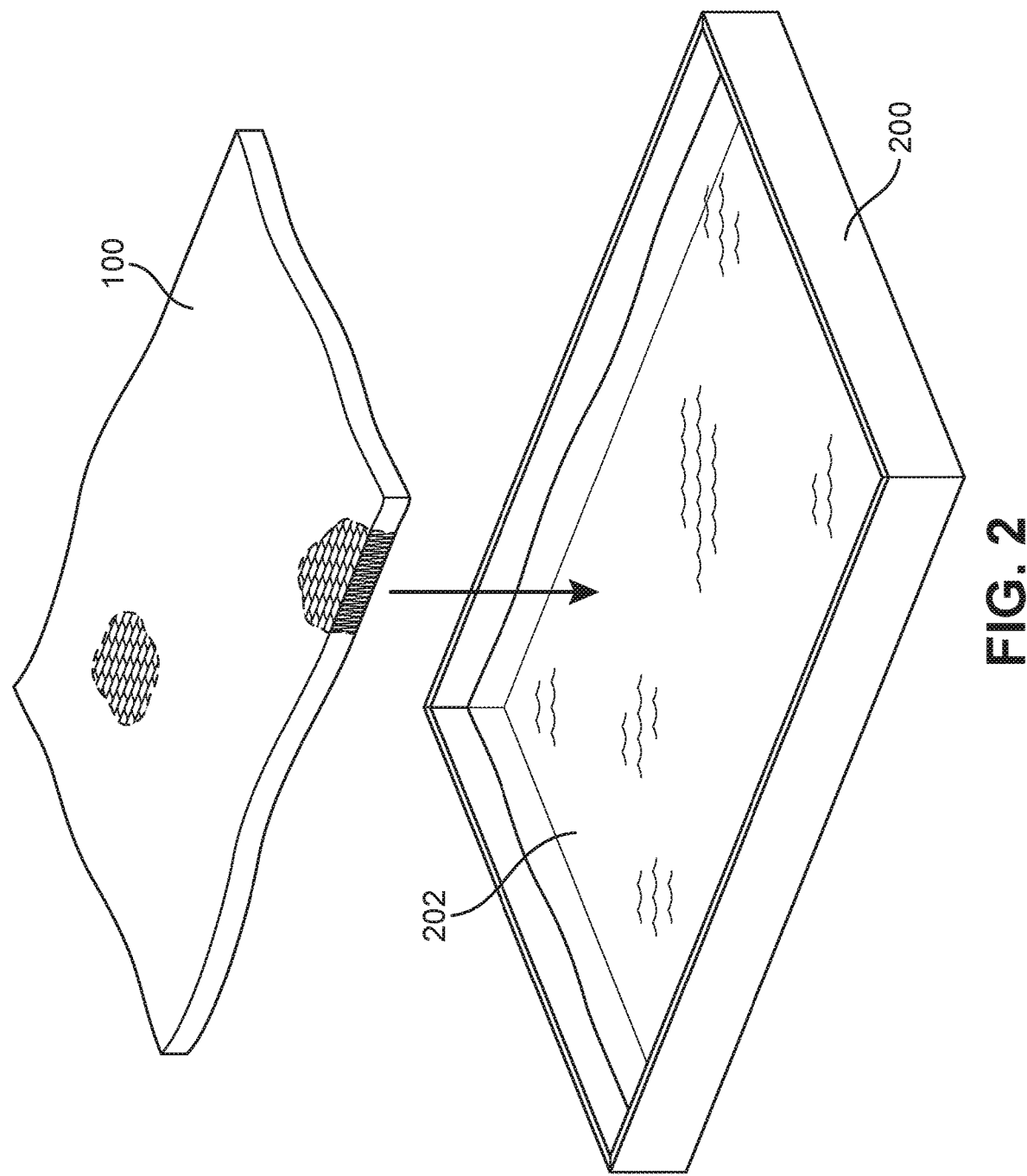
FIG. 2 is a schematic view of an embodiment of a knitted component being coated with polyurethane.

In some embodiments, knitted component 100 may be coated by various materials. The materials may be used to alter the properties of knitted component 100. For example, in some embodiments, knitted component 100 may be coated in a material that provides water resistance. In other embodiments, knitted component 100 may be coated in a material to change the stiffness or rigidity of knitted component 100. In other embodiments, knitted component 100 may be coated in other materials to provide various other properties to knitted component 100. As shown in FIG. 2, knitted component 100 may be placed into a container 200 that includes liquid polyurethane 202. Knitted component 100 may be fully submerged within polyurethane 202 such that polyurethane 202 may penetrate knitted component 100 and cover the strands that form knitted component 100. In some embodiments, the entire surface area of the strands of knitted component 100 may be covered or encapsulated by polyurethane 202. In other embodiments, 99 percent of the surface area of the strands of knitted component 100 may be encapsulated by polyurethane 202. In other embodiments, between 75 and 99 percent of the surface area of the strands of knitted component 100 may be encapsulated by polyurethane 202. In still further embodiments, less than 75 percent of the surface area of the strands of knitted component 100 may be encapsulated by polyurethane 202. Further, in other embodiments, only the surface area of the strands of knitted component 100 that are to be used with an article of footwear may be encapsulated by polyurethane 202. That is, in some embodiments, particular areas of knitted component 100 may be encapsulated by polyurethane 202 while other areas of knitted component 100 may remain free from polyurethane 202.

In some embodiments, various techniques may be utilized to coat knitted component 100 with polyurethane. As shown, knitted component 100 is inserted into container 200 that is filled with polyurethane 202. In some embodiments, polyurethane 202 may be sprayed upon knitted component 100. In other embodiments, other techniques may be utilized.

Figure 3:
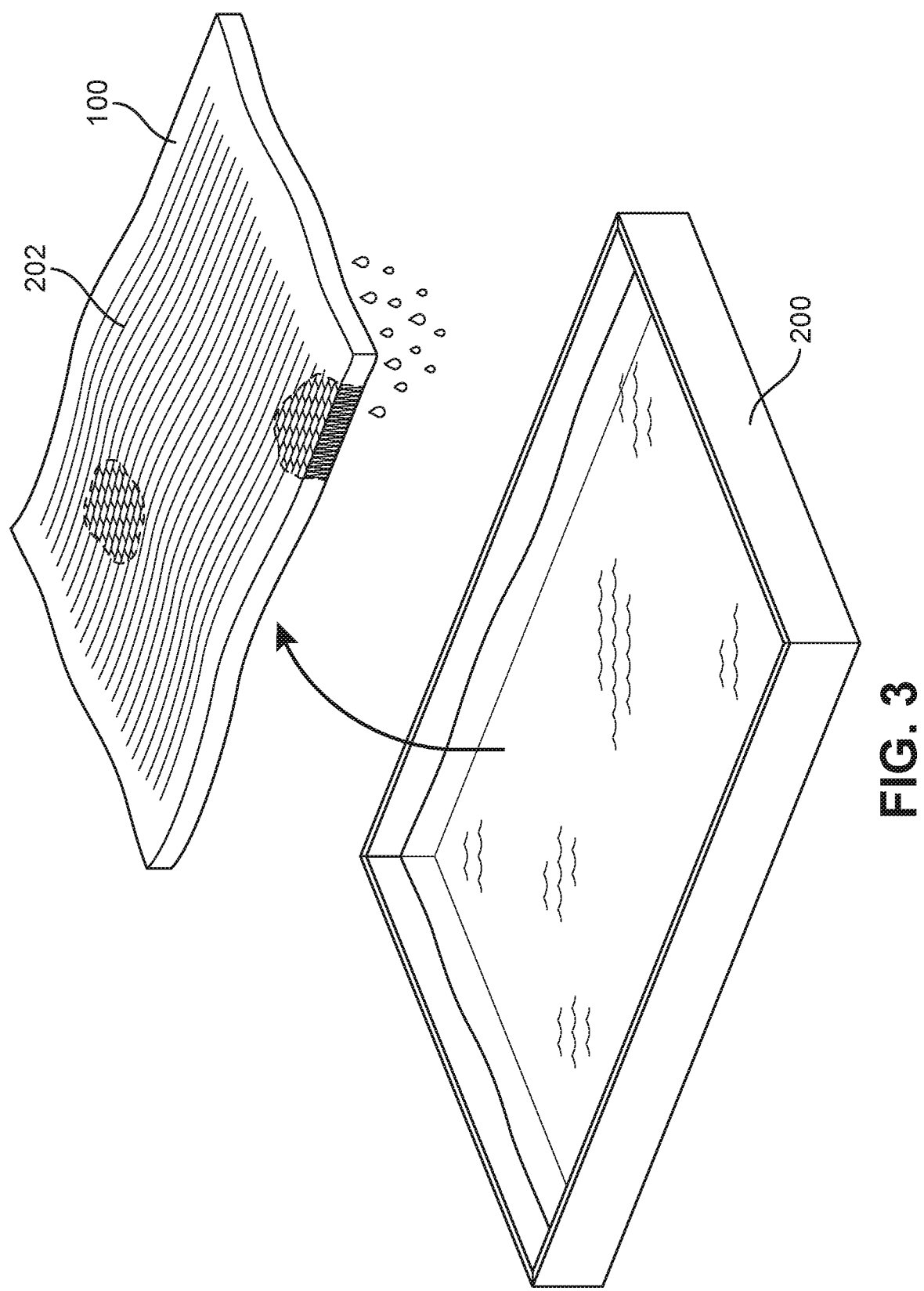
FIG. 3 is a schematic view of an embodiment of a knitted component coated with polyurethane.

Referring now to FIG. 3, knitted component 100 is removed from container 200. As shown, knitted component 100 now is covered or coated by polyurethane 202. In some embodiments, knitted component 100 may have a greater quantity of polyurethane 202 coating than desired. In other embodiments, knitted component 100 may also have an uneven or unequal coating of polyurethane 202 along knitted component 100. In some embodiments, the extra quantity of polyurethane 202 may be removed from knitted component 100 such that knitted component 100 may have an even or uniform coating along the surface of knitted component 100.

Figure 4:
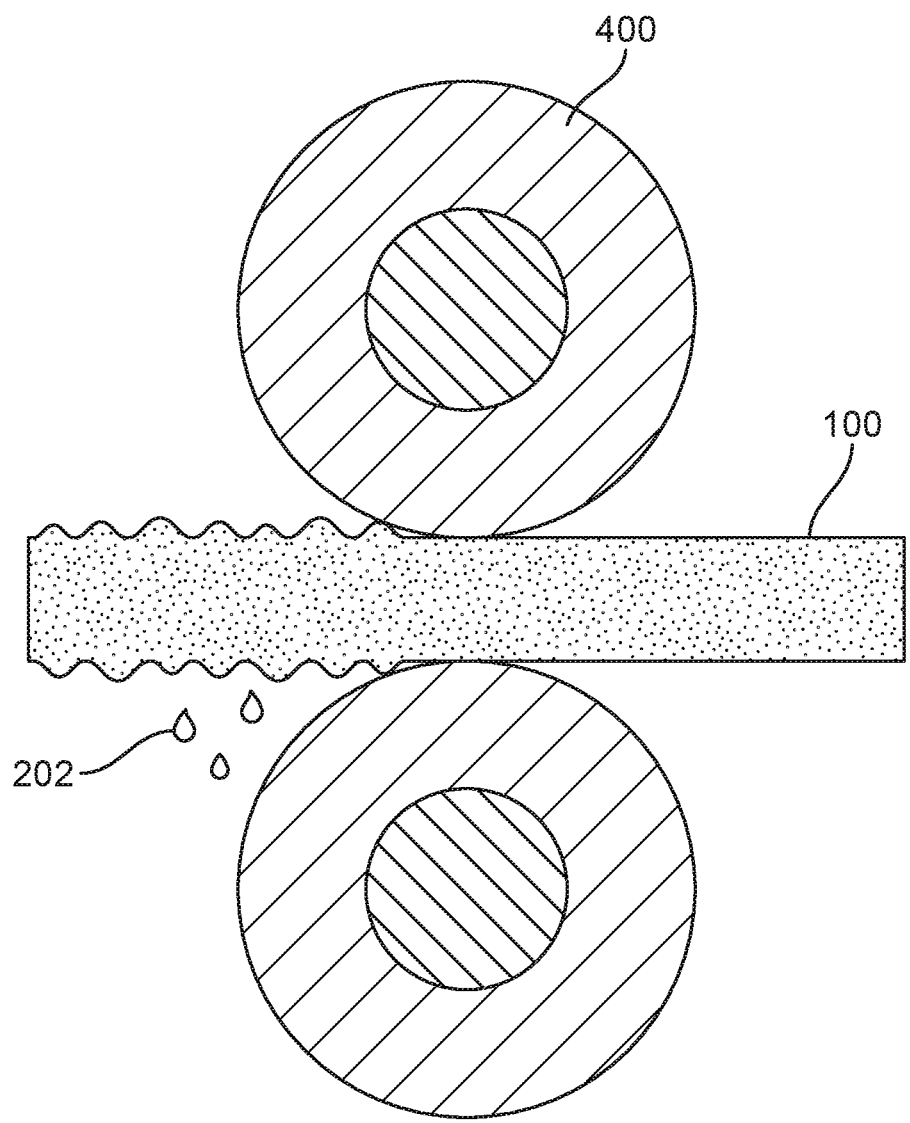
FIG. 4 is a schematic view of an embodiment of a set of rollers removing excess polyurethane from the knitted component.

In some embodiments, various techniques may be used to even the quantity of polyurethane 202 along knitted component 100. As shown in FIG. 4, knitted component 100 may pass through a set of rollers 400. Set of rollers 400 may be spaced a particular distance away from one another such that the excess polyurethane 202 may be skimmed away from knitted component 100 by each of the rollers of set of rollers 400. Although polyurethane 202 is skimmed from knitted component 100 by set of rollers 400, other techniques may be used to remove excess polyurethane 202 from knitted component 100 while also maintaining an even distribution of polyurethane 202 along knitted component 100.

In some embodiments, the amount of polyurethane that is incorporated into knitted component 100 may be varied for various reasons. For example, in some embodiments a greater quantity of polyurethane 202 may be incorporated into knitted component 100 than in other embodiments. By utilizing a greater quantity of polyurethane 202 within knitted component 100 the rigidity of knitted component 100 may be increased when compared to a knitted component with lower quantity of polyurethane. In some embodiments the weight of polyurethane 202 to the weight of knitted component 100 may be one to one. That is, in some embodiments, the weight of polyurethane 202 that is incorporated with knitted component 100 may be equal to weight of knitted component 100. In other embodiments, the weight of polyurethane 202 to the weight of knitted component 100 may be 1 to 2.5. That is, in some embodiments, the weight of knitted component 100 may be 2.5 times as much as the weight of polyurethane 202 that is incorporated into knitted component 100. In other embodiments, the ratio of the weight of polyurethane 202 to the weight of knitted component 100 may be between 1 to 1 and 1 to 2.5. In still further embodiments, the ration of the weight of polyurethane 202 to the weight of knitted component 100 may be greater than 1 to 2.5. The ratio of the weight of polyurethane 202 to weight of knitted component 100 may therefore by altered or changed as desired to achieve particular properties such as greater rigidity or greater compressibility.

Figure 5:
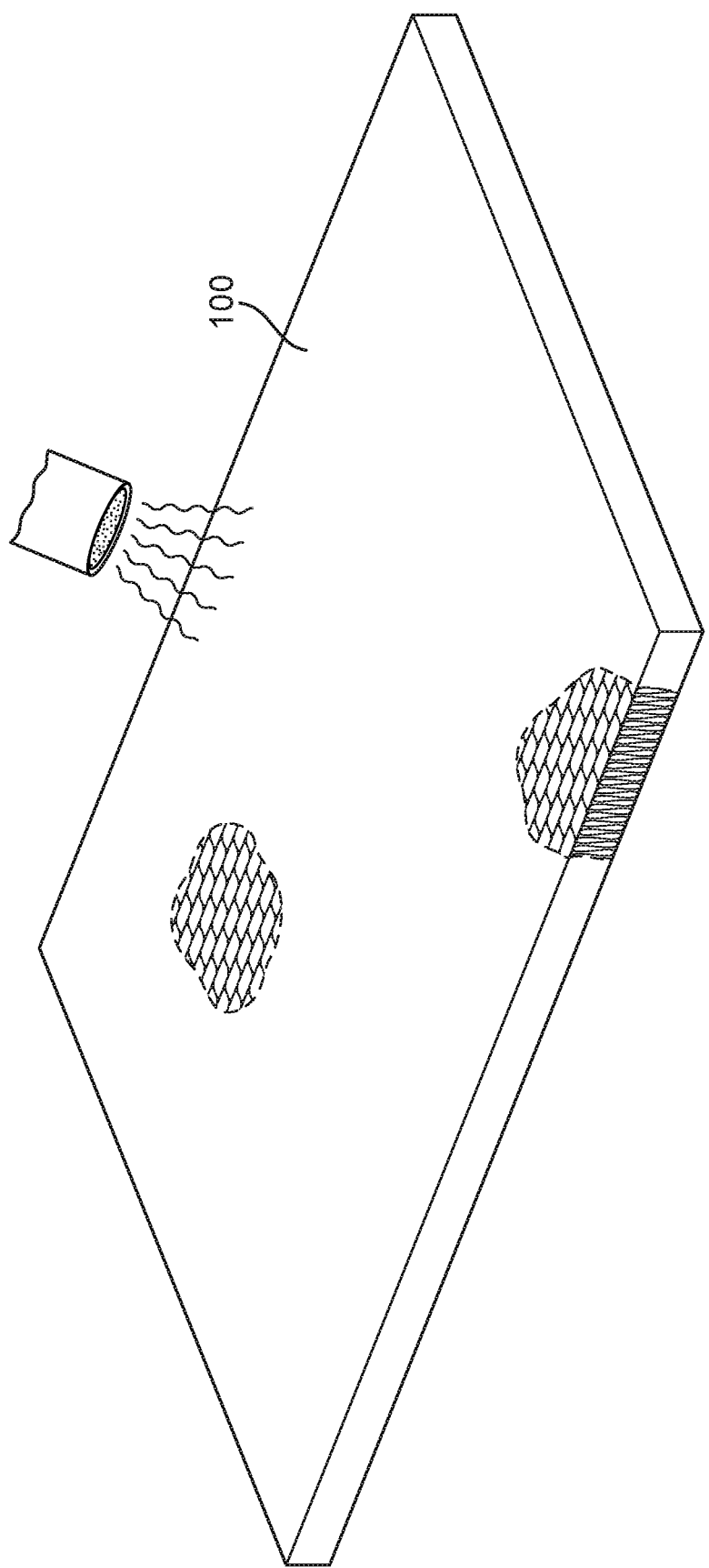
FIG. 5 is a schematic view of an embodiment of heater curing the polyurethane.

Referring now to FIG. 5, polyurethane 202 that coats knitted component 100 may be cured-dried. In some embodiments, polyurethane-coated knitted component 100 may pass through a heating chamber or tunnel. Additionally, other techniques may be utilized to cure polyurethane 202. The cured knitted component 100 may change properties when cured. That is, in some embodiments, the polyurethane may harden such that knitted component 100 may have a greater rigidity or stiffness when compared to knitted component 100 without a cured polyurethane coating. Further, the cured polyurethane may strengthen knitted component 100 such that knitted component 100 is able to resist deformation to a greater extent than when the polyurethane is in an uncured state.

Figure 6:
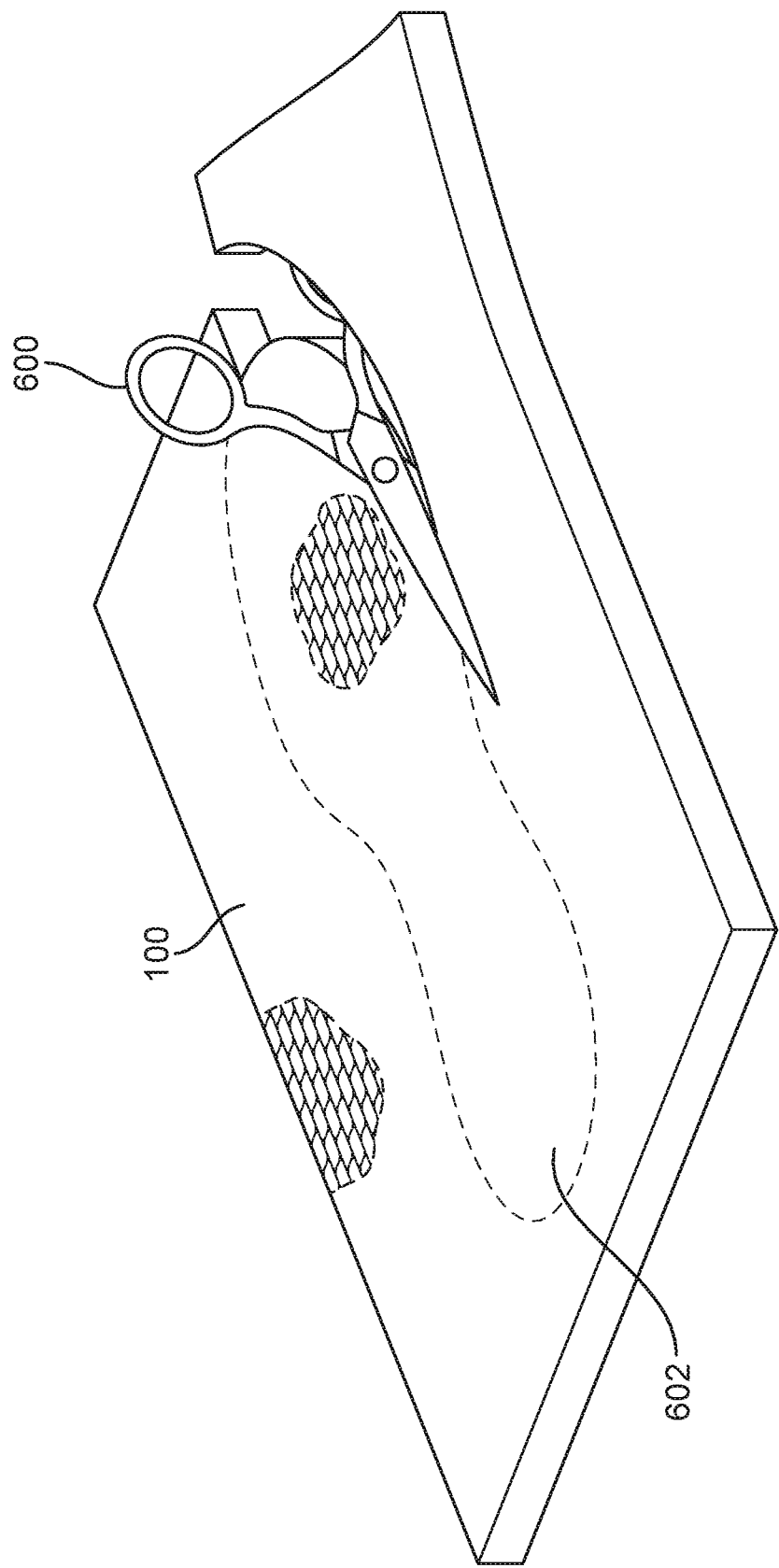
FIG. 6 is a schematic view of an embodiment of the knitted component being cut.

Referring now to FIG. 6, after the polyurethane has been cured knitted component 100 may be cut to a desired shape. As shown, knitted component 100 is cut using scissors or shears 600, however many other techniques may be used to cut knitted component 100 to the desired shape. In some embodiments, knitted component 100 may be cut using a laser, while in other embodiments a hot knife may be utilized. In still further embodiments, knitted component 100 may be cut using a die.

In some embodiments, various dimensions of knitted component 100 may be cut. For example, as shown in FIG. 6 the length and width of knitted component 100 may be cut or altered. In other embodiments, the depth or thickness of knitted component 100 may also be cut. That is, after curing, knitted component 100 may be cut to various shapes along various dimensions of knitted component 100. Additionally, although shown as being cut into the shape of a sole structure, in other embodiments, knitted component 100 may be cut into various shapes. As shown, midsole 602 may be cut from knitted component 100.

Figure 7:
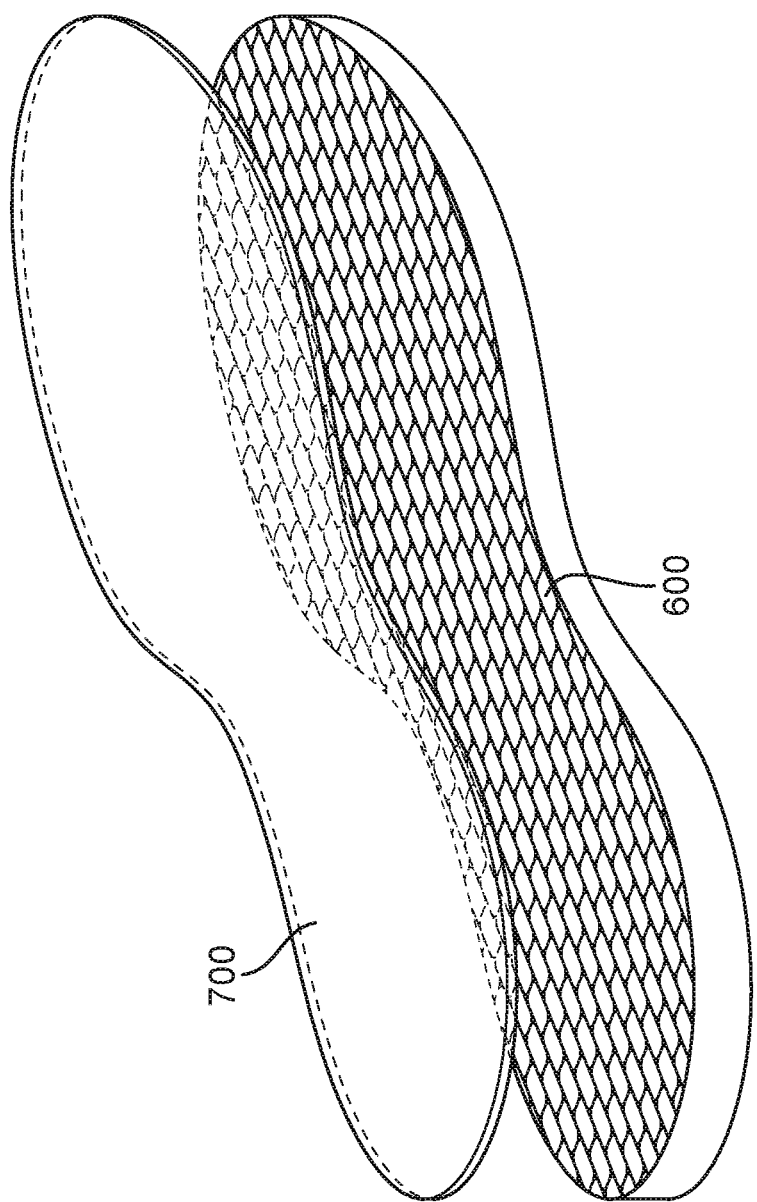
FIG. 7 is a schematic view of an embodiment of a midsole being covered by a thermoplastic polyurethane layer.

Referring now to FIG. 7, additional layers may be applied to midsole 602. In some embodiments, midsole 602 may be coated to provide additional wear resistance. In other embodiments, midsole 602 may include additional layers to provide water resistance. In further embodiments, midsole 602 may be encapsulated such that air bubbles are trapped in midsole 602, thereby providing additional cushioning to a user of an article of footwear that incorporates midsole 602. For example, as shown in FIG. 7, midsole 602 may be surrounded by thermoplastic polyurethane layer 700. In some embodiments, thermoplastic polyurethane layer 700 may be vacuum wrapped around midsole 602. Therefore, in some embodiments, midsole 602 may be surrounded by thermoplastic polyurethane layer 700. Thermoplastic polyurethane layer 700 may provide additional protection to the strands within midsole 602. Thermoplastic polyurethane layer 700 may be transparent, opaque, or translucent. Further, thermoplastic polyurethane layer 700 may be various colors. By utilizing thermoplastic polyurethane layer 700, midsole 602 may have a more finished appearance when compared to midsole 602 without thermoplastic polyurethane layer 700.

In some embodiments, a layer may be utilized to provide additional cushioning. In some embodiments, thermoplastic polyurethane layer 700 may be sealed around midsole 602. In some embodiments, thermoplastic polyurethane layer 700 may trap air or another gaseous substance within a cavity formed by thermoplastic polyurethane layer 700. That is, in some embodiments, thermoplastic polyurethane layer 700 may surround midsole 602 and trap a gas such that when midsole 602 is compressed the gas particles within midsole 602 are trapped by thermoplastic polyurethane layer 700 forming an air bladder. In this configuration, a sole structure that includes midsole 602 and thermoplastic polyurethane layer 700 may provide additional resistance to compression when compared to a sole structure that includes midsole 602 without a thermoplastic polyurethane layer that forms an air bladder. In still further embodiments, thermoplastic polyurethane layer 700 may be punctured to release any air that may be trapped within thermoplastic polyurethane layer 700. By puncturing thermoplastic polyurethane layer 700, sole structure 702 may have different properties than when thermoplastic polyurethane layer 700 is not punctured. For example, sole structure 702 may deform to a greater degree when subjected to a given force when thermoplastic polyurethane layer 700 is punctured than compared to if thermoplastic polyurethane layer 700 is not punctured. In still further embodiments, midsole 602 may be surrounded by thermoplastic polyurethane layer 700 without thermoplastic polyurethane layer forming an air bladder.

Figure 8:
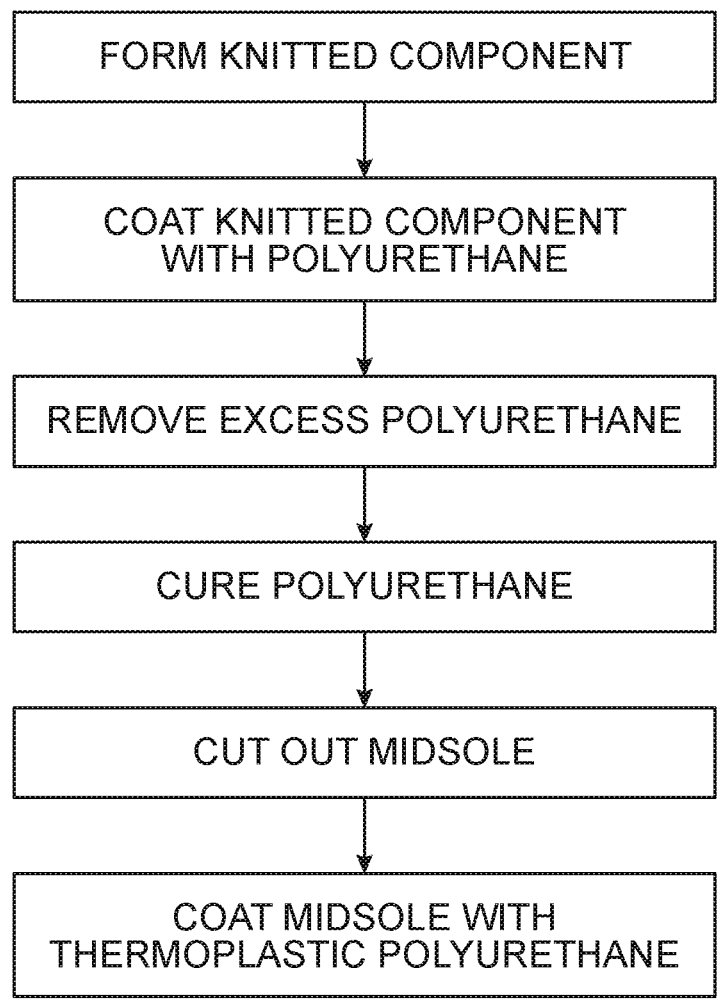
FIG. 8 is a flowchart of an embodiment of the steps used to form a midsole.

Referring to FIG. 8, the various steps shown in FIGS. 1-7 are depicted in a flow chart format. In some embodiments, the particular order in which the steps are performed may be altered. Additionally, in some embodiments, various steps may be skipped. For example, in some embodiments the midsole may not be coated by a layer of thermoplastic polyurethane.

In some embodiments, an alternate process may be utilized to form an insole or component for an article of footwear. In some embodiments, a thread or strand may be utilized for form an insole, midsole, or other components of a sole structure. In some embodiments, the thread or strand may be configured to be expandable. For example, in some embodiments, a thermoplastic or thermoset material that is able to be blown or foamed may be used to form portions of a midsole, insole, or other components of a sole structure. In some embodiments, the thread may include a blowing agent. In other embodiments, the material may be configured to be blown or expanded using supercritical gas.

Foaming During Extrusion

Figure 9:
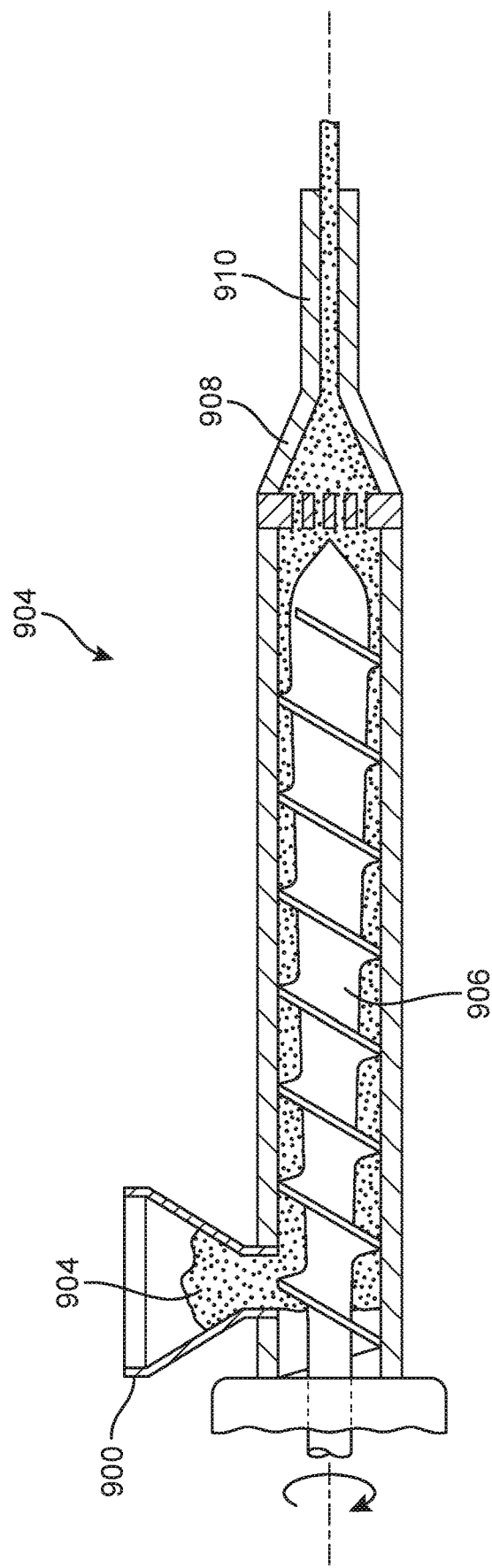
FIG. 9 is a schematic view of an embodiment of an extruder.

Some embodiments can include provisions for creating thermoset threads using an extrusion process. Referring now to FIG. 9, an exemplary embodiment is depicted. As shown, feeder 900 includes pre-blown material 902 for use in an extrusion process. In an exemplary embodiment material 902 includes an olefin block copolymer such as Infuse® by The Dow Chemical Company, a blowing agent, and a cross-linking agent. Additionally, material 902 may be an elastomer or include an elastomer. Further, material 902 may be a combination of various materials. The percentage of each of the ingredients within the extruder material may also be altered to form sole structures with different densities. For example, the mixture may be altered to form a stiff sole structure or midsole if desired.

In some embodiments, the extrusion process may cause the blowing agent of material 902 to activate. As shown, extruder 904 includes screw 906. As screw 906 rotates the friction between screw 906 and material 902 or other components may cause the blowing agent to activate. This activation then may cause material 902 to foam. In this embodiment there is no need for an additional heat source to activate the blowing agent of material 902. As material 902 foams, material 902 may pass through die 908. Die 908 may shape material 902 as material 902 exits extruder 904.

In some embodiments, various die shapes may be used to form extruded threads. Here, it may be understood that "die shape" refers to the geometry of an orifice in an extruding die, which is configured to impart a predetermined geometry on an extruded part (e.g., a square die results in a foamed thread with a square cross-sectional geometry). In some embodiments, the die shape may be square. In other embodiments, the die may be utilized form a circular or oval-shaped cross section of foamed thread. In still further embodiments, the die may be in the shape of a figure eight. In still further embodiments, the shape of the die may be C-shaped, U-shaped, or I-shaped. Additionally, the die may be other shapes.

In some embodiments, a tunnel may be utilized in addition to extruder 904. In some embodiments, tunnel 910 may be attached to die 908. In other embodiments, tunnel 910 may be spaced from die 908. Foamed material 902 may be subjected to additional process as material 902 passes through tunnel 910. In some embodiments, microwaves may be emitted within tunnel 910 onto material 902. The microwaves may cause the cross-linking agent to be activated, thereby causing a cross-linking of material 902. In other embodiments, tunnel 910 may be subjected to heat. This heat may cause the cross-linking agent to be activated within material 902. After the process depicted in FIG. 9, material 902 may be incorporated into an article of footwear.

Figure 10:
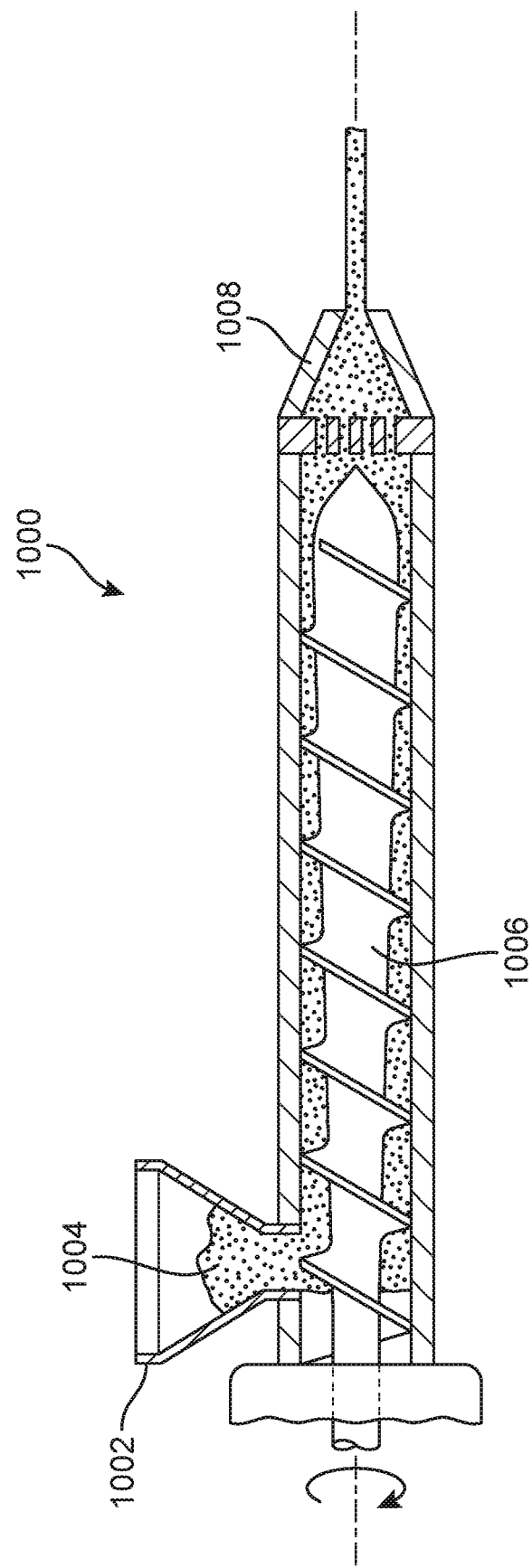
FIG. 10 is a schematic view of an alternate embodiment of an extruder.

Referring to FIG. 10, another exemplary embodiment of an extruder is depicted. In this embodiment, extruder 1000 includes feeder 1002. Feeder 1002 includes material 1004 that comprises thermoplastic polyurethane or other plastic. In some embodiments material 1004 may include a blowing agent. Material 1004 may be compressed by screw 1006 such that material 1004 is forced through die 1008 of extruder 1000. In some embodiments, supercritical gas may be injected into extruder 1000 such that supercritical gas is inserted into material 1004. As material 1004 exits die 1008 the supercritical gas rapidly expands and causes material 1004 to foam. In other embodiments, friction from screw 1006 causes the blowing agent in material 1004 to activate. This activation causes material 1004 to foam. In still further embodiments, material 1004 may be subjected to additional heat (i.e., from an external heater adjacent the extruding die). The additional heat may cause the blowing agent to activate and thereby foam material 1004. After the process as depicted in FIG. 10, the blown material 1004 may be utilized in a sole structure or midsole for an article of footwear.

Foaming Post-Knitting

In some embodiments, a component (e.g., an insole or midsole) may be knit from a plastic thread that is non-foamed. Following the knitting, the plastic thread may be foamed. This may be accomplished in various ways in different embodiments. In some embodiments, a blowing agent can be mixed into the plastic material during extrusion, but the temperature of the extrusion process can be controlled so that the temperature never rises high enough for the material to foam up during extrusion. Then, following knitting of the non-foamed thread into a component, the component can be heated so that the thread foams, resulting in a foamed knit component. In other embodiments, no blowing agent may be used in the extrusion process. Instead, once a non-foamed plastic thread has been knitted into a knit component, a supercritical gas can be forced into the knit component to foam the threads, which also results in a foamed knit component.

Figure 11:
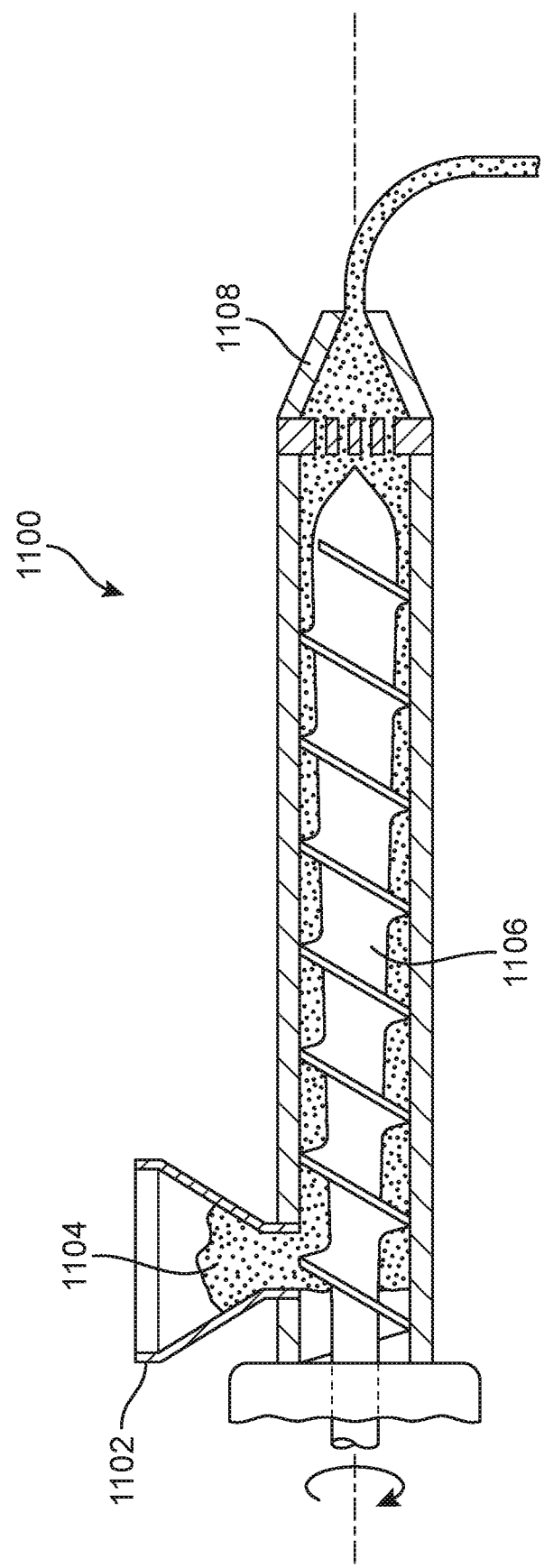
FIG. 11 is a schematic view of another alternate embodiment of an extruder.

Referring to FIG. 11, another exemplary embodiment of an extruder is depicted. In this embodiment, extruder 1100 includes feeder 1102. Feeder 1102 includes material 1104. In some embodiments, material 1104 may include a blowing agent, however, in other embodiments, material 1104 may not include a blowing agent. Material 1104 is sent through extruder 1100 and screw 1106 forces material 1104 through die 1108. In some embodiments, the temperature of material 1104 may be monitored to ensure that a blowing agent within material 1104 is not activated by heat. In other embodiments that do not include a blowing agent temperature monitoring may not be necessary.

Figure 12:
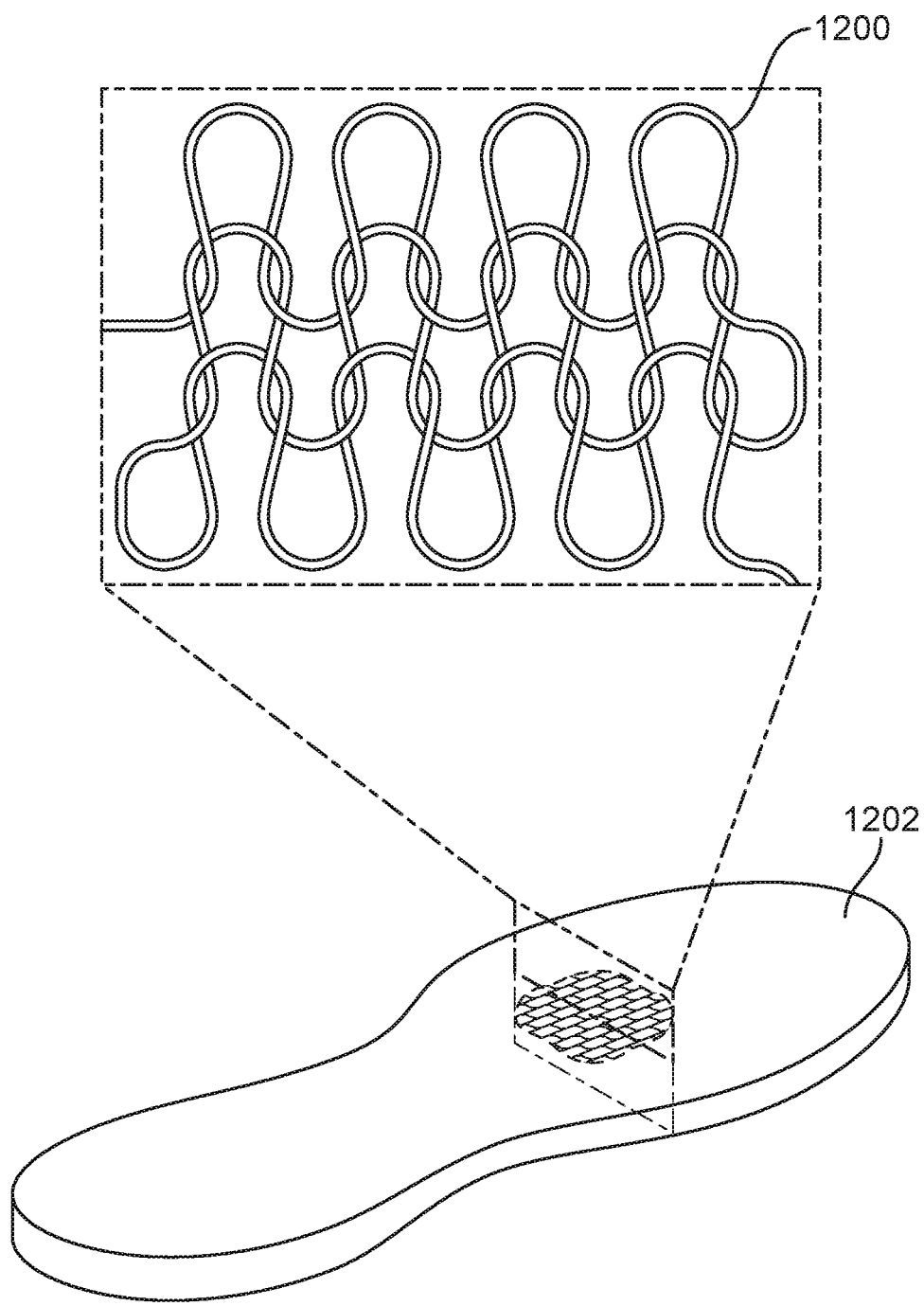
FIG. 12 is a schematic view of a knitted component.

Referring now to FIG. 12, an exemplary embodiment of process for forming a foamed plastic is depicted. As shown, thread 1200 may be used to form a portion of sole structure 1202. Thread 1200 may be formed using an extrusion process as described with reference to FIG. 11. In this embodiment, thread 1200 may be extruded without activating a blowing agent or utilizing a supercritical gas.

As shown in FIG. 12, the non-blown thread 1200 may be incorporated into sole structure 1202 utilizing a knit configuration. In other embodiments, a woven or non-woven configuration may also be utilized.

Figure 13:
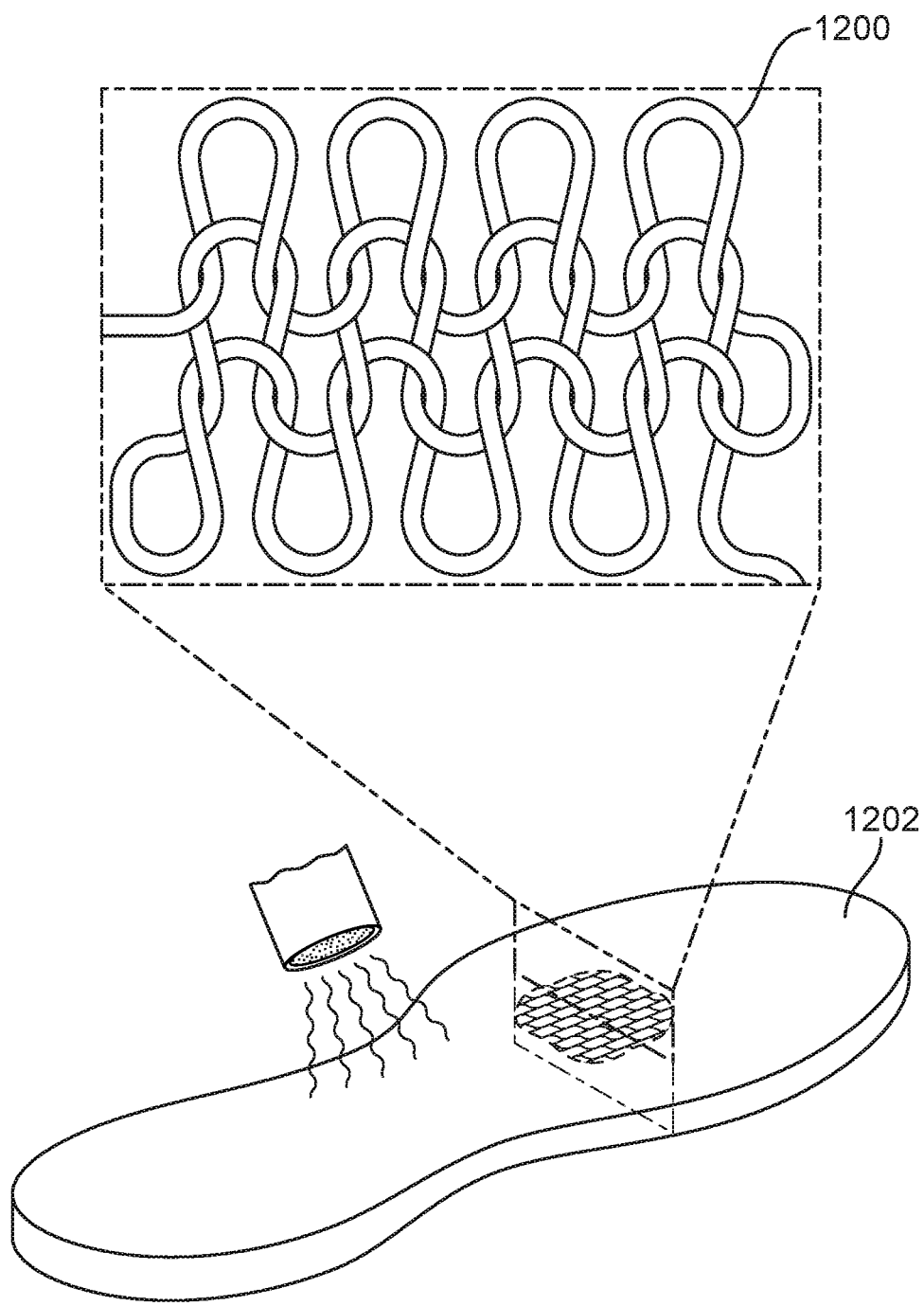
FIG. 13 is a schematic view of the knitted component when foamed.

Referring now to FIG. 13, thread 1200 may be subjected to additional processing after being positioned into a knit, woven, or non-woven configuration. In some embodiments, thread 1200 may be subjected to heat. The heat may activate a blowing agent and cause thread 1200 to expand or foam. In other embodiments that do not include a blowing agent, supercritical gas may be used to cause thread 1200 to expand or foam. In some embodiments, thread 1200 may be placed into a mold before causing thread 1200 to expand. That is, the mold may assist in providing a form for thread 1200.

Figure 14:
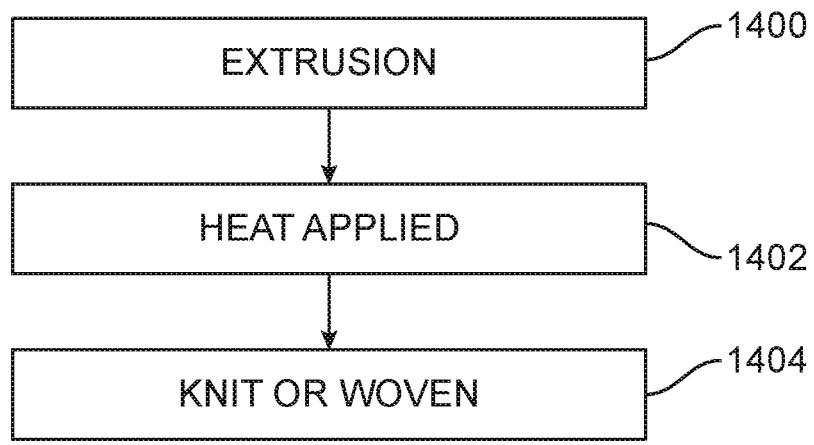
FIG. 14 is a flowchart of an embodiment of the steps used to form a midsole used foamed threads.

Referring to FIG. 14, the process for forming a midsole, insole, or sole structure component is depicted. Referring to step 1400, a material may be sent through an extruder. The shape and size of the extruder may influence the shape and size of the extruded material. As discussed previously, the material may be a thermoplastic or thermoset material. Further, the material may be formed of a chemical mixture of plastic and rubber. This type of material may be utilized such that the sole structure would not require a separate outsole upon completion.

Referring to step 1402, as the material is being extruded heat may be applied to the material. In some embodiments, a heater may be included internally within the extrusion equipment. In other embodiments, heat may be applied by an external source. As the heat is applied the material may foam or expand into a foamed thread. In some embodiments, the foamed thread may have a diameter of about 1.5 to 2 millimeters. In other embodiments, the foamed thread may have a diameter of 3 millimeters or 4 millimeters. In still further embodiments, the foamed thread may have diameters greater than 4 millimeters or less than 1.5 millimeters.

Referring to step 1404, after the material has been subjected to heat, and therefore foamed, the foamed thread may be knit or woven into a particular shape and size. In some embodiments, the foamed thread may be knit or woven into the shape of an insole, midsole, or other sole structure component. In other embodiments, the foamed thread may be knit or woven into a pre-existing medium to be incorporated into a component of a sole structure.

In further embodiments, after the material has been subjected to heat, the foamed thread may be placed in a mold. The mold may be used to partially shape the foamed thread into the shape of a midsole, outsole, or other sole structure component. In some embodiments, the foamed thread may then be subjected to additional heat after being located within a mold. In some embodiments, the foamed thread will expand further once subjected to additional heat. The foamed thread may therefore fill the mold. Further, in some embodiments, the sidewalls of the midsole, outsole, or sole structure component may be finished by pad pressing hot pads into the sidewalls.

As discussed previously, the material that the foamed thread is formed from may include a mixture of plastic and rubber to form a sole structure that would not require an additional outsole layer. In other embodiments, a separate outsole layer may be formed from a different compound from the midsole layer. For example, the outsole layer may be formed of a rubber thread that could in turn be knit directly into the foamed thread midsole. Further, in some embodiments, the foamed thread midsole may be directly knit into an upper.

The process of utilizing foamed thread may decrease the quantity of time necessary to form a sole structure when compared to other conventional techniques. For example, the process as described above may be automated. Further, by specifically laying each knit thread the amount of waste may be reduced when forming a sole structure. Additionally, the process described above may contribute to unique shapes and designs of midsoles. The precise layout of foamed thread may also allow for midsoles to be formed with varying properties. For example, a greater quantity of foamed thread may be placed in a heel region than in a forefoot region, therefore providing more cushioning in the heel region as compared to the forefoot region.

In some embodiments, rather that utilizing a foaming agent in the composition of the thread, a supercritical gas may be used during the extrusion process. Upon depressurization and heating, the gas may rapidly expand causing voids in the extruded material.

Figure 15:
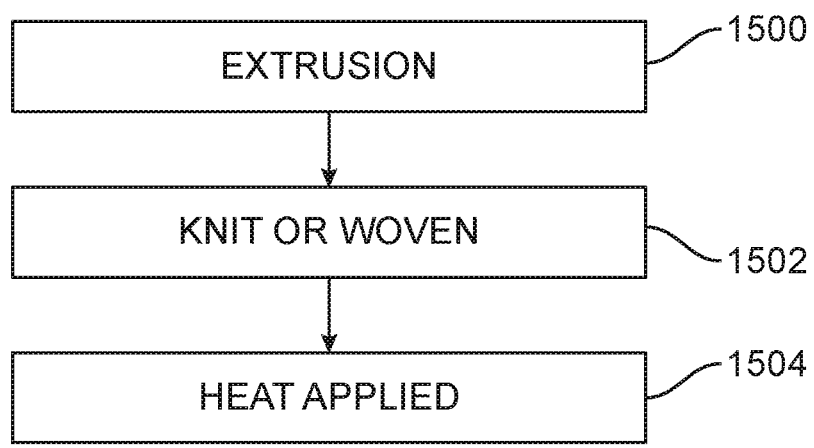
FIG. 15 is a flowchart of an alternate embodiment of the steps used to form a midsole using foamed threads.

Referring to FIG. 15, an alternative process of forming a sole structure component is depicted. As shown in step 1500, material may be extruded. In some embodiments, the material may be similar to the material as described with reference to step 900. In other embodiments, the material may be a different type of material.

Referring to step 1502, after the material has been extruded into a thread form, the thread may be knit or woven. In some embodiments, the thread may be knit or woven into a pre-existing article or textile. In other embodiments, the thread may be woven or knit with itself. That is, in some embodiments, a knit or woven structure may be formed using the extruded thread. In some embodiments, the extruded thread may be arranged into the shape or form of a sole structure component. In other embodiments, the extruded thread may be arranged within a mold, such as mold in the shape of a midsole.

After the extruded thread has been arranged in a particular manner, heat may be applied in step 1504. The heat applied may activate a blowing agent and expand or foam the extruded thread such that the extruded thread fills a mold. Additionally, the heat applied may expand the extruded thread into the shape of a midsole or other sole structure component. By arranging the extruded thread in a particular arrangement, various shapes and configurations may be achieved when heat is applied to the extruded thread.

After step 1404 or step 1504, the sole structure component may be subjected to post-processing. For example, in some embodiments, the sole structure component may be dipped in thermoplastic polyurethane such that the sole structure component is coated in thermoplastic urethane. Further, the sole structure component may be painted or powder-coated. Adhesives may be secured to the sole structure component, or an outsole layer may be secured to the sole structure component.

Various materials may be used in the processes shown in FIGS. 14 and 15. In some embodiments, the material may include a blowing agent in addition to a cross-linking agent. In some embodiments, the extruder may provide heat to the material and thereby trigger the foaming agent (for example, as depicted in step 1402). This may cause the extruded thread to expand or foam. In some embodiments, the foamed thread may be further passed through a microwave tunnel or heating tunnel to add a cross-linking effect.

Figure 16:
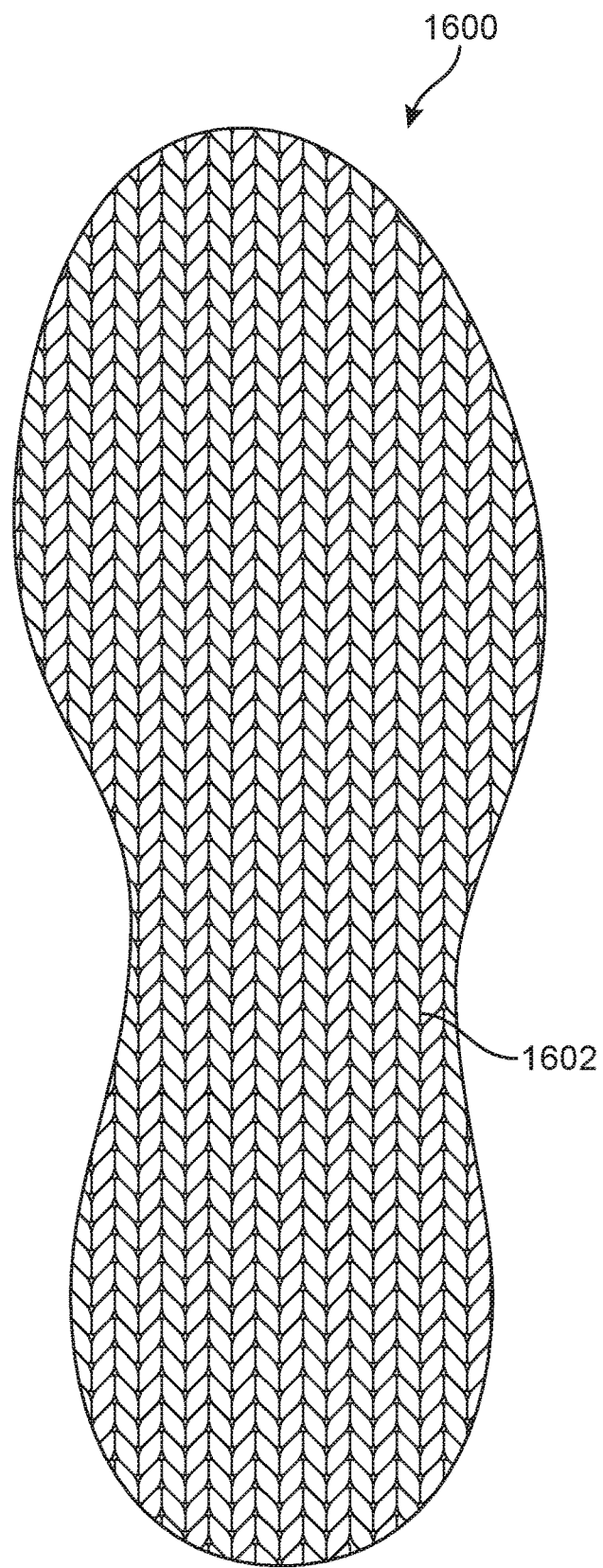
FIG. 16 is a schematic view of an embodiment of a sole with a woven foam thread.

In another embodiment, shown in FIG. 16, a sole 1600 may be formed by weaving foamed plastic threads 1602 together into a midsole shaped component. In some embodiments, depending on whether foamed threads are knitted or woven, the threads may be configured with different diameters.

In some embodiments, various densities of foamed material may be utilized. In the embodiments as described with reference to FIGS. 9-15 the density of the foamed thread may be altered. For example, in some embodiments, a large quantity of blowing agent or supercritical gas may be utilized. Therefore the foamed thread may have a lower density than embodiments that do not utilized a large quantity of blowing agent or supercritical gas. Further, in other embodiments, the foamed thread may be spaced differently in different areas. In some embodiments, a greater density of foamed threads may be utilized in a heel region to provide additional cushioning to the heel as compared to the forefoot region.

In some embodiments, the thread formed by the extrusion processes described above may be able to be knit into an upper or outsole. For example, in some embodiments, a midsole may be formed from the foamed thread and the midsole may be knit into an upper. In some embodiments, the midsole may be separately knit from an upper or midsole. In other embodiments, threads that are used to form a midsole may be knit into other components of an article of footwear as the midsole is being formed. In such a configuration an upper and midsole may have a continuous knit configuration. In other embodiments, the midsole can be knit to the upper.

In some embodiments, the components formed using the processes described in reference to FIGS. 9-15 may be subjected to post-processing. In some embodiments, the components may be subjected to the process as described with reference to FIGS. 1-8. For example, a component formed of foamed thread may be coated with polyurethane. The component may then pass through rollers than may remove excess polyurethane. The component may then be cured and cut. Additionally, in some embodiments, the component may then be covered with thermoplastic polyurethane. Therefore the process described with reference to FIGS. 1-8 may be used in conjunction with the process described with reference to FIGS. 9-15.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of forming a knitted component for an article of footwear, comprising:
   extruding a mixture including a plastic material to form a non-foamed plastic thread;
   knitting the non-foamed plastic thread into a knitted component;
   causing the non-foamed plastic thread in the knitted component to undergo a foaming process to form a foamed knitted component with foamed plastic threads, wherein a diameter of the foamed plastic threads expands during the foaming process;
   placing the foamed knitted component into a mold to shape the foamed knitted component into a shape of a sole structure component for an article of footwear;
   subjecting the foamed knitted component in the mold to additional heat so that the foamed plastic threads expand further to fill the mold; and
   wherein the foamed plastic threads have a diameter of at least 1.5 millimeters.

2. The method according to claim 1, wherein the mixture includes a blowing agent and wherein causing the non-foamed plastic thread to undergo a foaming process includes heating the non-foamed plastic thread in the knitted component to activate the blowing agent.

3. The method according to claim 2, wherein the method includes controlling the temperature of the extrusion so that the mixture including the plastic material is heated below a temperature at which the blowing agent is activated.

4. The method according to claim 1, wherein causing the non-foamed plastic thread to undergo a foaming process includes injecting a supercritical gas into the non-foamed plastic thread.

5. A method of forming a sole component for an article of footwear, comprising:
   extruding a mixture including a plastic material to form a non-foamed plastic thread;
   arranging the non-foamed plastic thread into a sole component for an article of footwear;
   causing the non-foamed plastic thread to undergo a foaming process to form a sole component with foamed plastic threads, wherein a diameter of the foamed plastic threads expands during the foaming process;
   placing the sole component into a mold to shape the sole component for the article of footwear;
   subjecting the sole component in the mold to additional heat so that the foamed plastic threads expand further to fill the mold; and
   wherein the foamed plastic threads have a diameter of at least 1.5 millimeters.

6. The method according to claim 5, wherein the mixture includes a blowing agent and wherein causing the non-foamed plastic thread to undergo a foaming process includes heating the non-foamed sole component to activate the blowing agent.

7. The method according to claim 6, wherein the method includes controlling the temperature of the extrusion so that the mixture including the plastic material is heated below a temperature at which the blowing agent is activated.

8. The method according to claim 5, wherein causing the non-foamed plastic thread to undergo a foaming process includes injecting a supercritical gas into the non-foamed plastic thread.

9. The method according to claim 5, wherein arranging the non-foamed plastic thread comprises knitting the non-foamed plastic thread to form a knitted sole component.

10. The method according to claim 5, wherein arranging the non-foamed plastic thread comprises weaving the non-foamed plastic thread to form a woven sole component.

11. The method according to claim 5, wherein the sole component is a midsole.

12. The method according to claim 5, further comprising pad pressing hot pads into sidewalls of the sole component.

13. The method according to claim 12, wherein the diameter of the foamed plastic threads is between 1.5 to 2 millimeters.

14. The method according to claim 12, wherein the diameter of the foamed plastic threads is about 3 millimeters or 4 millimeters.

15. The method according to claim 12, wherein the diameter of the foamed plastic threads is greater than 4 millimeters.

16. The method according to claim 5, wherein the non-foamed plastic thread is knitted with a second thread comprising a different material than the plastic material.

17. The method according to claim 5, wherein the method further comprises applying a thermoplastic coating to the sole component.

18. The method according to claim 1, wherein the diameter of the foamed plastic threads is about 3 millimeters or 4 millimeters.

19. The method according to claim 1, further comprising pad pressing hot pads into sidewalls of the sole structure component.

20. The method according to claim 1, wherein the diameter of the foamed plastic threads is greater than 4 millimeters.

* * * * *